US 6,552,329 B2

(12) United States Patent
Haas et al.

(10) Patent No.: US 6,552,329 B2
(45) Date of Patent: *Apr. 22, 2003

(54) METHOD FOR A QUANTITATIVE DETECTION OF A LINEAR AND ROTARY MOVEMENT

(75) Inventors: Heinz Haas, Regensburg (DE); Martin Haushalter, Regensburg (DE); Frank Möllmer, Pentling (DE)

(73) Assignee: Osram Opto Semi-Conductors GmbH Co. OHG, Rogensburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/935,502

(22) Filed: Aug. 23, 2001

(65) Prior Publication Data

US 2002/0000514 A1 Jan. 3, 2002

Related U.S. Application Data

(62) Division of application No. 09/401,021, filed on Sep. 21, 1999, now Pat. No. 6,313,460.

(51) Int. Cl.⁷ .................................. G01D 5/34
(52) U.S. Cl. ......................... 250/231.13; 250/231.14
(58) Field of Search ................... 250/231.13, 231.14, 250/213.16, 213.17, 231.18, 237 G; 324/175; 33/125 C; 341/13, 31

(56) References Cited

U.S. PATENT DOCUMENTS

| 4,152,589 A | 5/1979 | Mitchell |
| 4,654,525 A | 3/1987 | Ebina et al. |
| 5,294,793 A | 3/1994 | Schwaiger et al. |
| 6,093,928 A | 7/2000 | Ohtomo et al. |
| 6,313,460 B1 * | 11/2001 | Haas et al. ............ 250/231.13 |

FOREIGN PATENT DOCUMENTS

| DE | 43 32 022 C2 | 3/1995 |
| DE | 43 41 767 C1 | 6/1995 |

* cited by examiner

*Primary Examiner*—Stephone B. Allen
(74) *Attorney, Agent, or Firm*—Laurence A. Greenberg; Werner H. Stemer; Ralph E. Locher

(57) ABSTRACT

A method for a quantitative detection of a linear movement or rotary movement. The method includes the steps of emitting radiation from at least two light emitters in a pulsed mode at a same clock frequency or different clock frequencies and detecting the radiation from the two light emitters by a detection device. It furthermore includes the steps of increasingly shadowing the radiations by a movable grid device or separating signals originating from different light emitters by an evaluation circuit coupled to said detection device.

1 Claim, 3 Drawing Sheets

METHOD FOR A QUANTITATIVE DETECTION OF A LINEAR AND ROTARY MOVEMENT

CROSS-REFERENCE TO RELATED APPLICATION

This is a division of U.S. application Ser. No. 09/401,021, filed Sep. 21, 1999 now U.S. Pat. No. 6,313,460.

BACKGROUND OF THE INVENTION

Field of the Invention

The invention relates to a method for a quantitative detection of a linear and rotary movement. The method uses an optical device that contains a light emission device, a grid device containing translucent areas and opaque areas, a detection device and an evaluation circuit coupled to the detection device.

Optical encoders are used to detect the rotation angle or, respectively, a length and a direction of a rotary movement or, respectively, linear movement of moving bodies. The essential components of such a device are the emitter system, a grid plate, normally a grid disk or a grid straight edge, and the detector system. The emitter system normally contains a light-emitting diode. The light beam emitted from the laser diode is modulated by the grid plate. The grid plate is connected to a moving body and has a periodic opening pattern. The detector system detects the transmitter signal (modulated by the grid plate) from the laser diode and, at the output, and supplies information relating to the light beam and the direction of movement.

Previous versions of optical encoders contain a light-emitting diode having additional optics, the grid plate and a detector array with evaluation logic. At the emitter end, a light beam is produced, which illuminates the detector array as uniformly as possible. The detector array contains at least two photodiodes, which are disposed in the direction of a linear movement, or tangentially with respect to a rotary movement. The distance between the photodiodes is one quarter of the grid disk period, and the signals from two adjacent photodiodes are phase-shifted through 90° with respect to one another. The output signals from the photodiodes are suitably processed in an evaluation circuit in order to supply the position and direction of movement.

Two photodiodes disposed in a line are sufficient to define the position and direction. However, embodiments having four photodiodes disposed in a line are widely used in the prior art, for example as described in U.S. Pat. No. 4,654,525. This configuration and the evaluation circuit which is coupled to the photodiodes additionally allow compensation for light intensity fluctuations in the laser diode.

The previous systems are thus limited to a configuration of a plurality of photo receivers on the detector side. Such a limitation may be disadvantageous for several reasons. It is thus of primary importance for an optical encoder to be constructed in a space-saving manner. This requirement is thus difficult to satisfy from the start on the detector side.

SUMMARY OF THE INVENTION

It is accordingly an object of the invention to provide a method for a quantitative detection of a linear and rotary movement which overcomes the above-mentioned disadvantages of it the prior art devices of this general type, whose detector side can be manufactured more easily. In particular, an object of the present invention is to specify such a device that can be operated with only one photo receiver.

With the foregoing and other objects in view there is provided, in accordance with the invention, an optical device for quantitative detection of linear or rotary movements. The optical device has a light emission device, a grid device containing translucent areas and opaque areas, and a detection device. An evaluation circuit is provided which is coupled to the detection device. The light emission device has at least two light emitters that are disposed alongside one another in the direction of a linear movement or tangentially with respect to a rotary movement. The light emitters can be actuated in a pulsed mode at the same or different clock frequencies, and in that their radiation strikes the detector alternately. The detection device has a photo receiver that is of such a size and is positioned such that the radiation from all the light emitters can be detected by it and the evaluation circuit is configured for separating the signals which originate from different light emitters. From the detected signals the position and the movement direction can be derived.

The photo receiver and the evaluation circuit are preferably integrated in a single semiconductor chip.

The clock frequency which is applied to the emitters is much higher than the modulation frequency of the grid plate, that is to say the frequency at which the light beams normally pass through the grid openings when the moving body is moving.

In a first embodiment of the invention, a control device is provided for the light emitters, which is configured in such a manner that it actuates the light emitters with control pulses at the same clock frequency, but with a defined phase shift which may be, for example, 90°.

In a second embodiment of the invention, a control device is provided for the light emitters, which is configured such that it actuates the light emitters with control impulses at a different clock frequency.

Vertical resonator light emission devices, in particular vertical cavity surface emitting lasers are advantageously used as the light emitters, since they are distinguished by particularly low divergence and a high light yield.

The optical encoder according to the invention has, in particular, the advantage that it can be operated with a single photo receiver.

Other features which are considered as characteristic for the invention are set forth in the appended claims.

Although the invention is illustrated and described herein as embodied in a method for a quantitative detection of a linear and rotary movement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
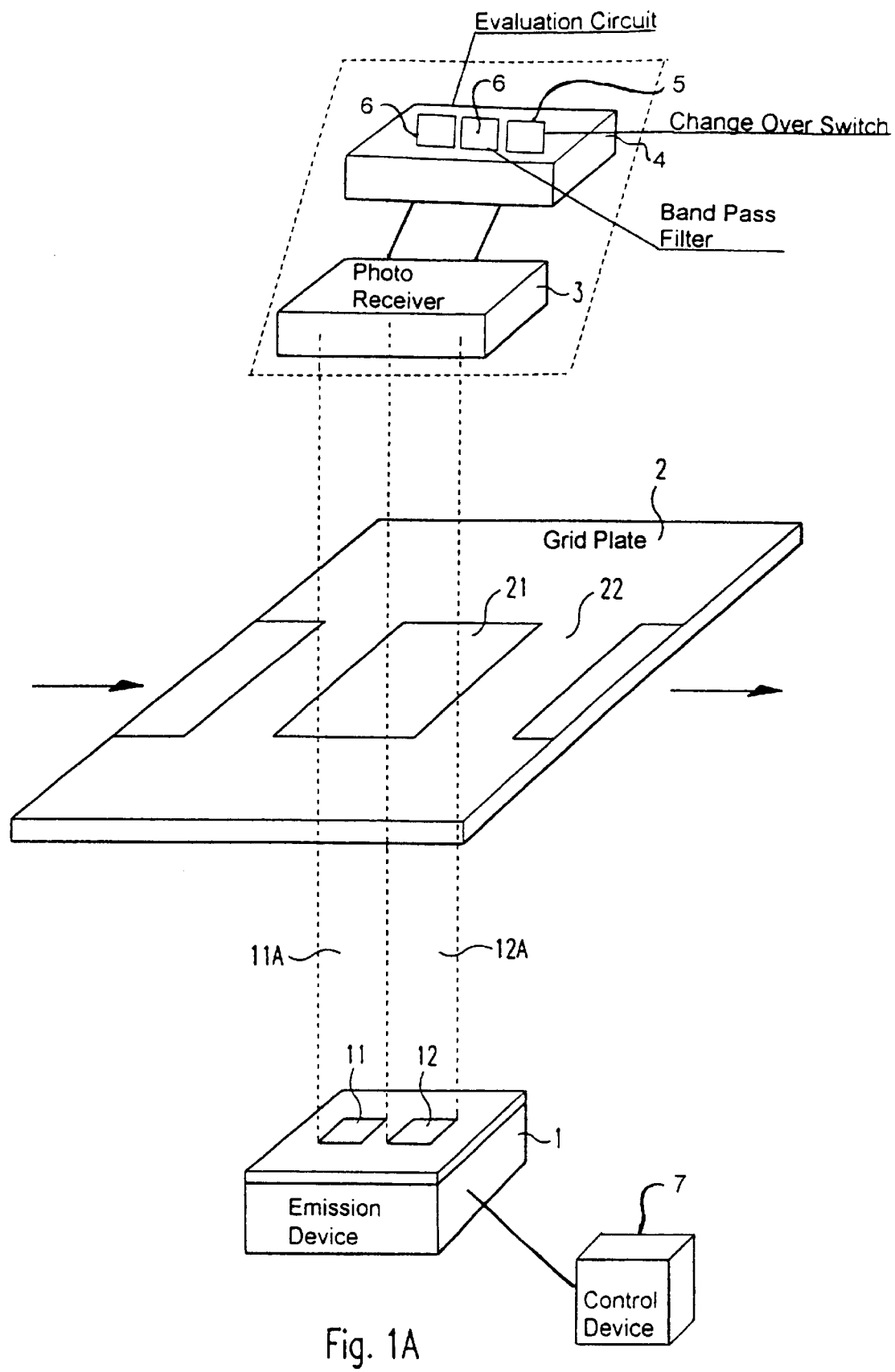
FIG. 1A is a perspective view of one exemplary embodiment of an optical device according to the invention.

In all the figures of the drawing, sub-features and integral parts that correspond to one another bear the same reference symbol in each case. Referring now to the figures of the drawing in detail and first, particularly, to FIG. 1A thereof, there is shown one exemplary embodiment of an optical encoder according to the invention. An emission device 1 has two light emitters 11 and 12, which emit light beams 11A and 12A.

The light emitters 11 and 12 are preferably vertical resonator laser diodes such as vertical cavity surface emitting lasers (VCSEL)), since these are distinguished by particularly good emission characteristics, in particular low divergence and a high light yield. In this case, there is no need for any other optical elements, such as lenses to focus the laser radiation.

The light beams 11A and 12A are used to define a length and direction of a rotary or linear movement of a moving body. For this purpose, the light beams 11a and 12A pass through a grid plate 2, which is attached to the moving body and at the same time images its movement. For detecting rotary movements, the grid plate 2 is generally a circular grid disk, it and for detecting linear movements it is a grid straight edge. The illustration shows a detail of the grid plate 2 that is moving, for example, as shown in the direction of the arrow. The grid plate 2 has a periodic opening pattern containing translucent areas 21, grid openings, and opaque areas 22. When the grid plate 2 is in certain positions, the light beams 11A and 12A can pass completely through the translucent areas 21, and then arrive at a photo receiver 3. The receiving area of the photo receiver 3 is sufficiently large to be able to detect both light beams 11A, 12A. The photo receiver 3 is connected to an evaluation circuit 4 in which signals are processed to form output signals, which supply the position and direction of movement information. The evaluation circuit 4 and the photo receiver 3 can be integrated in a single semiconductor chip as shown in dashed lines.

Figure 1B:
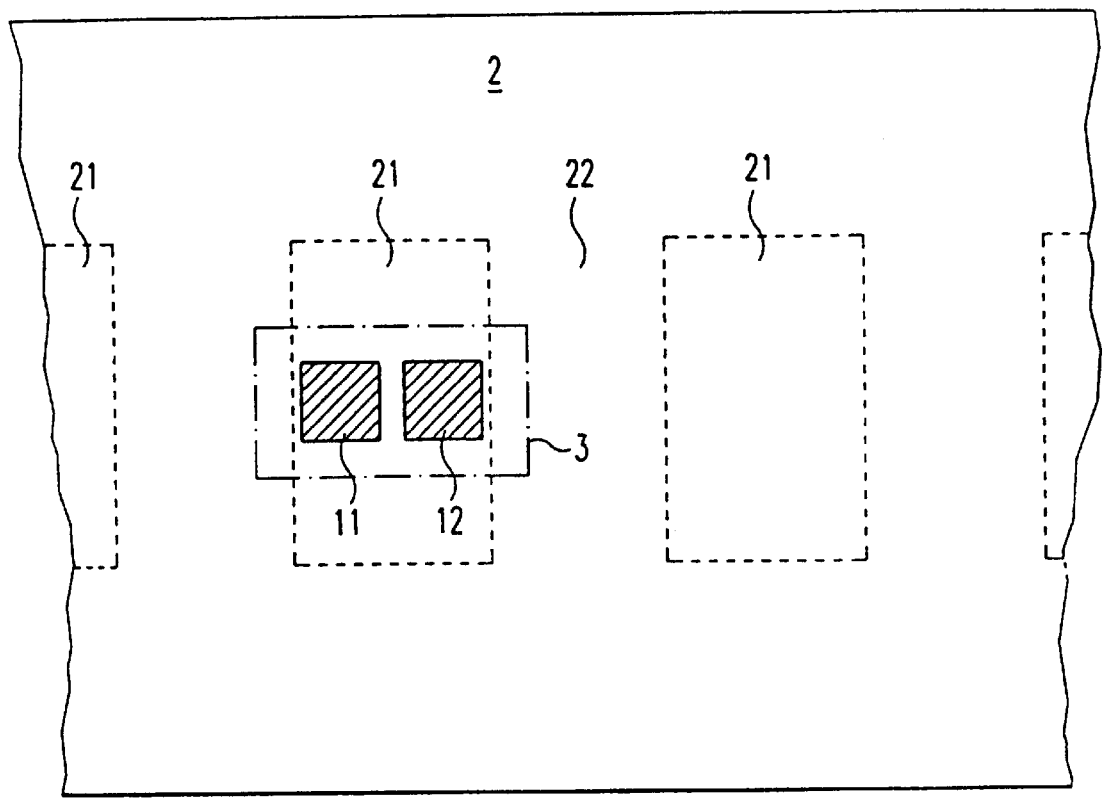
FIG. 1B is a plan view of the optical device shown in FIG. 1.

FIG. 1B shows a plan view of the configuration shown in FIG. 1A. The illustration shows a position of the grid plate 2 in which both light beams emitted by the light emitters 11 and 12 (which are shown shaded) pass through the grid opening 21 and arrive at the receiving area of the photo receiver 3. As can be seen, a total width of the laser diodes (light emitters) 11 and 12 in the movement direction corresponds approximately to a width of the grid opening 21. The laser diodes 11, 12 are thus just located within the grid opening 21. In other words, a distance between the laser diodes 11, 12, that is to say between their respective front edges, is approximately one quarter of a period of the grid disk.

If the grid plate 2 now moves in a specific direction, then the radiation from one of the laser diodes 11, 12 is shadowed to an ever greater extent by one of the opaque areas 22, while the radiation from the other laser diode still passes through completely. In order to allow this to be detected, it is necessary to separate the timing of the signals from the laser diodes 11, 12 by the evaluation circuit 4.

For this purpose, the laser diodes 11, 12 are actuated in the pulsed mode by a control device 7, in order thus to allow the signals to be separated in the evaluation circuit 4. The signal frequency is very many times greater than the modulation frequency of the grid disk, that is to say the frequency at which the light beams pass through the grid openings 21 as a result of the movement of the moving body.

Figure 2:
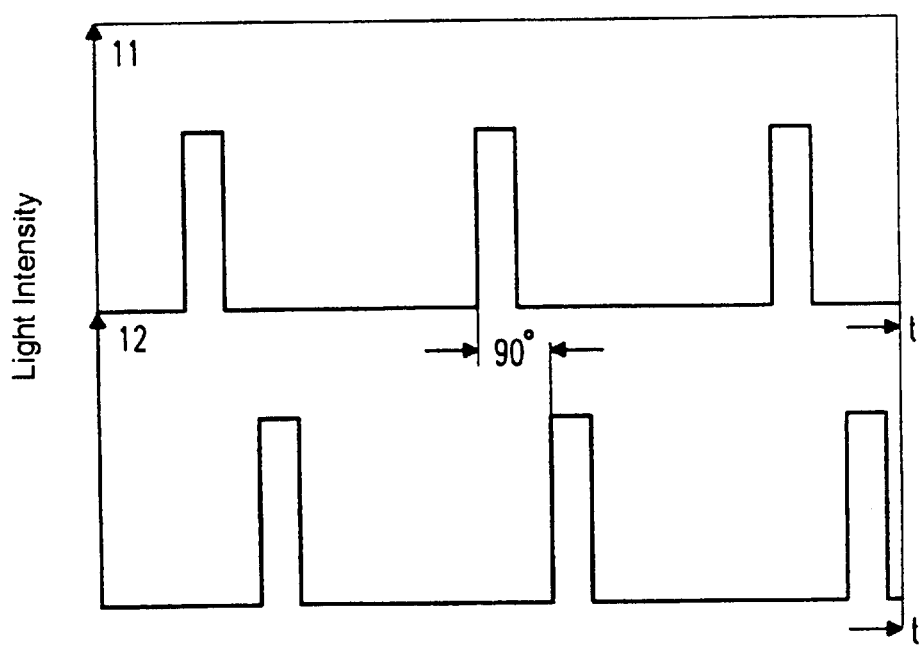
FIG. 2 is a diagram of light pulse trains of emitters according to a first embodiment of the invention.

FIG. 2 shows a first embodiment of the pulsed mode. In this case, the laser diodes 11, 12 are actuated at the same clock frequency, but the pulse train from the laser diode 12 has a phase lag of 90° in comparison with the pulse train from the laser diode 11. The evaluation circuit 4 thus receives a sequence of two pulses, which follow one another at a short interval, from the photo receiver 3 during each cycle. The leading-phase and lagging-phase pulses are supplied to different evaluation channels in the evaluation circuit 4. The two evaluation channels thus contain signals whose phases are shifted through 90° in the time domain.

In FIG. 2, the pulse levels of both pulse trains are equal and are constant with time, that it so say the grid disk 2 is stationary. If it is now set in motion, then the intensity of one of the two pulse trains decreases, since the light beam 11A, 12A from the corresponding laser diode 11, 12 is increasingly shadowed. Since the evaluation circuit 4 knows that the leading-phase pulse originates from the laser diode 11, it can deduce the direction of the movement by finding which pulse train is weaker. In addition, it can determine the speed and the length of the movement from the rate at which the intensity is reduced and the further profile of the signals.

The distribution of the pulses between the various evaluation channels can be carried out by an electronic changeover switch contained in the evaluation circuit 4, for example using a flip-flop.

Figure 3:
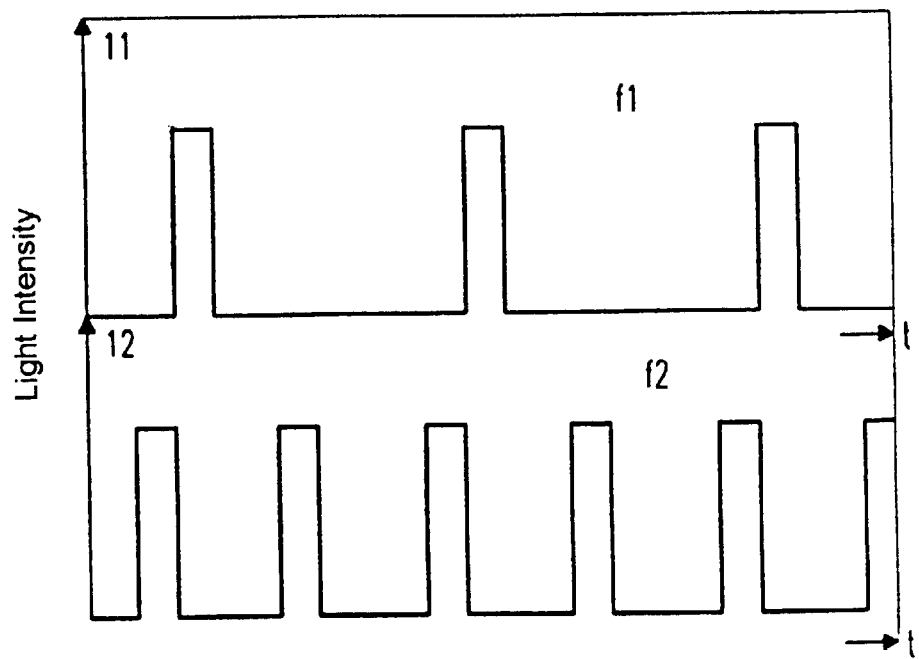
FIG. 3 is a diagram of light pulse trains of the emitters according to a second embodiment of the invention.

FIG. 3 shows a second embodiment of the pulsed mode. In this case, the laser diodes 11, 12 are actuated at different clock frequencies. For example, as indicated, the laser diode 11 is actuated at a first frequency f1 and the laser diode 12 at a second frequency f2 which is higher by a factor of 2 than the frequency f1. In this case as well, the pulse trains are supplied to different evaluation channels. The pulse trains can be separated, for example, by bandpass filters 6.

In this variant, the evaluation circuit 4 identifies the laser diodes 11, 12 from the pulse frequency and can thus make a statement on the movement direction.

The invention is not limited to the use of only two light emitters 11, 12. It is also possible to use more than two light emitters disposed in a line which, for example, emit pulse trains according to the embodiment shown in FIG. 2, which are successively phase-shifted through 90° with respect to one another, or according to the embodiment shown in FIG. 3, which have a corresponding number of different clock frequencies.

We claim:

1. A method for a quantitative detection of one of a linear movement and rotary movement, comprising the steps of:
   emitting radiation from at least two light emitters in a pulsed mode at one of a same clock frequency and different clock frequencies;
   detecting said radiation from said at least two light emitters by a detection device;
   increasingly shadowing one of the radiations by a movable grid device; and
   separating signals originating from different light emitters by an evaluation circuit coupled to said detection device.

* * * * *

UNITED STATES PATENT AND TRADEMARK OFFICE
CERTIFICATE OF CORRECTION

PATENT NO. : 6,552,329 B2
DATED : April 22, 2003
INVENTOR(S) : Heinz Haas et al.

It is certified that error appears in the above-identified patent and that said Letters Patent is hereby corrected as shown below:

<u>Title page,</u>
Item [73], should read as follows:
-- Osram Opto Semiconductors GmbH & Co. OHG, Regensburg (DE) --

Signed and Sealed this

Eighteenth Day of November, 2003

JAMES E. ROGAN
*Director of the United States Patent and Trademark Office*